United States Patent
Pak et al.

(10) Patent No.: US 8,043,595 B2
(45) Date of Patent: Oct. 25, 2011

(54) MESOPOROUS CARBON INCLUDING HETEROATOM, MANUFACTURING METHOD THEREOF, AND FUEL CELL USING THE MESOPOROUS CARBON

(75) Inventors: Chan-ho Pak, Seoul (KR); Sang-hoon Joo, Yongin-si (KR); Hyuk Chang, Seongnam-si (KR); Ji-man Kim, Suwon-si (KR); Hyung-Ik Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 506 days.

(21) Appl. No.: 11/443,167

(22) Filed: May 31, 2006

(65) Prior Publication Data

US 2007/0122334 A1    May 31, 2007

(30) Foreign Application Priority Data

Nov. 29, 2005   (KR) ................. 10-2005-0115057

(51) Int. Cl.
    *C01B 31/00*    (2006.01)
    *C01B 15/12*    (2006.01)
    *B01J 21/18*    (2006.01)

(52) U.S. Cl. .............. 423/445 R; 423/275; 502/80

(58) Field of Classification Search .............. None
See application file for complete search history.

(56) References Cited

U.S. PATENT DOCUMENTS

| | | | |
|---|---|---|---|
| 4,938,942 A * | 7/1990 | Gorman et al. | 423/448 |
| 6,228,803 B1 | 5/2001 | Gadkaree et al. | |
| 6,585,948 B1 * | 7/2003 | Ryoo et al. | 423/445 R |
| 6,812,187 B1 * | 11/2004 | Pak et al. | 502/180 |
| 2002/0187896 A1 | 12/2002 | Ryoo et al. | |
| 2004/0072061 A1 | 4/2004 | Nakano et al. | |
| 2004/0091415 A1 | 5/2004 | Yu et al. | |

FOREIGN PATENT DOCUMENTS

| | | |
|---|---|---|
| CN | 1521877 A | 8/2004 |
| JP | 2002-060211 | 2/2002 |
| JP | 2002-255531 | 9/2002 |
| JP | 2004-71253 | 3/2004 |
| JP | 2004-79244 | 3/2004 |
| JP | 2004-244311 | 9/2004 |
| JP | 2005-135671 | * 5/2005 |

(Continued)

OTHER PUBLICATIONS

Wu et al. Carbon/B2O3 Composite with Higher Capacity for Lithium Storage; Solid State Ionics; 170, pp. 117-121; 2004.*

(Continued)

*Primary Examiner* — Melvin C Mayes
*Assistant Examiner* — Guinever S Gregorio
(74) *Attorney, Agent, or Firm* — Christie, Parker & Hale, LLP (57) ABSTRACT

Provided are a mesoporous carbon containing at least one heteroatom boron and phosphorus, a manufacturing method thereof, and a fuel cell using the same. The mesoporous carbon contains a heteroatom such as boron and phosphorous to reduce sheet resistance, and thus can efficiently transfer electric energy. Such a mesoporous carbon can be used as a conductive material of electrodes for fuel cells. When the mesoporous carbon is used as a support for catalysts of electrodes, a supported catalyst containing the support can be used to manufacture a fuel cell having high efficiency.

13 Claims, 6 Drawing Sheets

FOREIGN PATENT DOCUMENTS

| | | | |
|---|---|---|---|
| JP | 2005135671 A | * | 5/2005 |
| KR | 2001-1127 A | | 1/2001 |
| KR | 10-2001-0040825 | | 5/2001 |
| KR | 10-2002-0084372 | | 11/2002 |
| KR | 2004-42142 | | 5/2004 |
| KR | 10-2005-0068090 | | 7/2005 |
| WO | WO 02/081372 | | 10/2002 |

OTHER PUBLICATIONS

Ryoo et al.; Synthesis of Highly Ordered Carbon Molecular Sieves via Template-Mediated Structural Transformation; The Journal of Physical Chemistry B; vol. 103, No. 37, pp. 7743-7746; 1999.*

Translation JP 2004-079244 A.*

Office Action issued in Korean Patent Application No. 2005-115057 on Oct. 31, 2006.

Office Action issued by Chinese Patent Office in Chinese Patent Application No. 2006100998494 on Mar. 27, 2009.

Wu, Xiaodong et al. *Carbon/B2O3 composite with higher capacity for lithium storage*. Solid State Ionics 170 (2004) 117-121.

Japanese Office Action dated Mar. 23, 2010, issued in Japanese Patent Application No. 2006-155410.

SIPO Office action dated Jul. 30, 2010, for corresponding Chinese Patent application 200610099849.4, noting listed reference in this IDS.

Korean Determination Registration dated Jul. 31, 2007, for Korean priority Patent application 10-2005-0115057, noting listed references in this IDS, as well as JP 2002-255531 and KR 10-2004-0042142, previously submitted in an IDS dated Jan. 17, 2007.

English machine translation of Japanese Publication 2002-060211, listed above, 16 pages.

* cited by examiner

MESOPOROUS CARBON INCLUDING HETEROATOM, MANUFACTURING METHOD THEREOF, AND FUEL CELL USING THE MESOPOROUS CARBON

CROSS-REFERENCE TO RELATED APPLICATION

This application claims the benefit of Korean Patent Application No. 2005-115057, filed on Nov. 29, 2005, in the Korean Intellectual Property Office, the disclosure of which is incorporated herein in its entirety by reference.

BACKGROUND OF THE INVENTION

1. Field of the Invention

Aspects of the present invention relates to mesoporous carbon including heteroatoms, a manufacturing method thereof, and a fuel cell using the mesoporous carbon, and more particularly, to mesoporous carbon having reduced sheet resistance due to the heteroatom, a manufacturing method thereof, and a fuel cell using the mesoporous carbon as a support for catalysts.

2. Description of the Related Art

A catalyst that is contained in electrodes of fuel cells to facilitate an electrochemical reaction plays an important role, and thus, the activity of the catalyst used in an electrode should be as high as possible. Since the activity of the catalyst increases as the reaction surface area of the catalyst increases, catalyst particles should be reduced in diameter to increase the reaction surface area and should be uniformly distributed in an electrode. Much research has been carried out relating to finding catalyst supports that provide a large surface area.

Meanwhile, in addition to a large surface area, which may be obtained through high porosity, a catalyst support for a fuel cell must have electrical conductivity to act as a path for the flow of electrons. A conventional example of such a support is an amorphous microporous carbon powder, such as activated carbon or carbon black and a regularly arranged carbon molecular sieve material (Korean Patent Laid-Open Gazette No. 2001-0001127).

However, it is known that micropores of such an amorphous microporous carbon powder are poorly connected. Therefore, in a conventional direct methanol fuel cell (DMFC), a supported catalyst that is prepared using an amorphous microporous carbon powder as a support exhibits much lower reactivity than metal particles themselves used as a catalyst.

However, when metal particles themselves are used as a catalyst, the amount of the catalyst required is greater, and thus, the manufacturing costs of a DMFC increase. Accordingly, the development of a supported catalyst that can improve catalyst activity is desirable.

SUMMARY OF THE INVENTION

Aspects of the present invention provide a mesoporous carbon having a reduced sheet resistance, and a method of preparing the same.

Aspects of the present invention also provide a supported catalyst containing the mesoporous carbon and a fuel cell having improved efficiency by using the supported catalyst.

According to an aspect of the present invention, there is provided a mesoporous carbon having mesopores and including at least one heteroatom such as, for example, boron or phosphorus.

The amount of the heteroatom is 0.5 to 20 parts by weight based on 100 parts by weight of the mesoporous carbon.

According to another aspect of the present invention, there is provided a method of preparing mesoporous carbon containing at least one heteroatom including: mixing a carbon precursor, a compound containing the at least one heteroatom, an acid and a solvent to obtain a carbon precursor mixture; impregnating an ordered mesoporous silica (OMS) with the carbon precursor mixture; heat-treating the impregnated OMS; carbonizing the heat-treated OMS; and removing the OMS from the carbonized result.

According to another aspect of the present invention, there is provided a supported catalyst comprising: the mesoporous carbon containing at least one heteroatom; and metal catalyst particles that are supported on the mesoporous carbon containing at least one heteroatom.

According to another aspect of the present invention, there is provided a fuel cell including a cathode, an anode and an electrolyte membrane interposed between the cathode and the anode, wherein at least one of the cathode and the anode comprises the mesoporous carbon containing at least one heteroatom; and a supported catalyst having metal catalyst particles that are supported on the mesoporous carbon containing at least one heteroatom.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A mesoporous carbon containing at least one heteroatom of boron and phosphorous according to an embodiment of the present invention shows a reduced sheet resistance.

Figure 1:
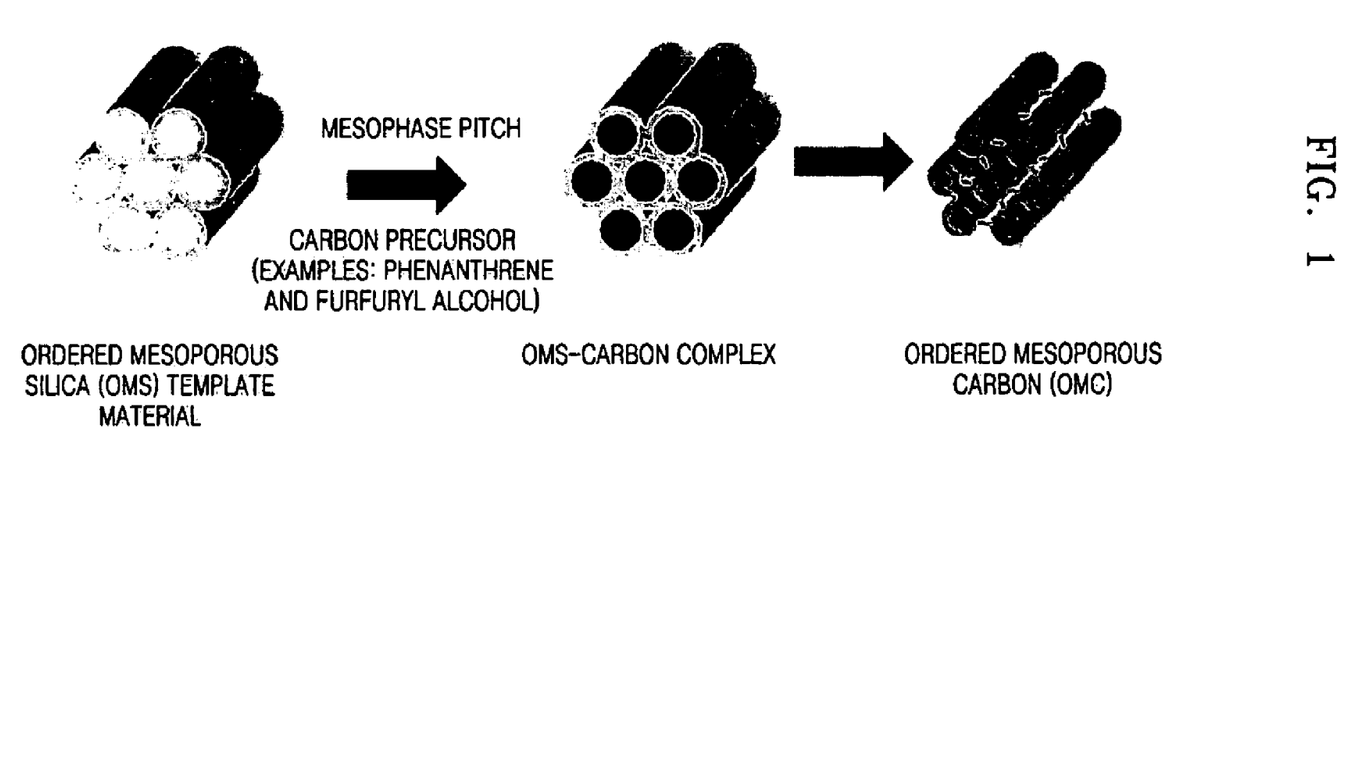
FIG. 1 is a schematic diagram illustrating a method of preparing mesoporous carbon according to an embodiment of the present invention.

FIG. 1 is a schematic diagram illustrating a method of preparing mesoporous carbon according to an embodiment of the present invention.

Referring to FIG. 1, a carbon precursor and a compound containing at least one heteroatom are introduced into an ordered mesoporous silica (OMS) template. As used herein, the term "at least one heteroatom" refers to at least one type of heteroatom, such as, for example boron or phosphorous. In other words, "heteroatom" refers to an element other than carbon. The result is heat-treated and carbonized to form an OMS-carbon complex. Herein, the OMS has an X-ray diffraction peak of 2 degrees or less because of regularly arranged pores.

Next, the OMS is removed from the OMS-carbon complex to obtain an ordered mesoporous carbon containing at least one heteroatom.

Figure 2:
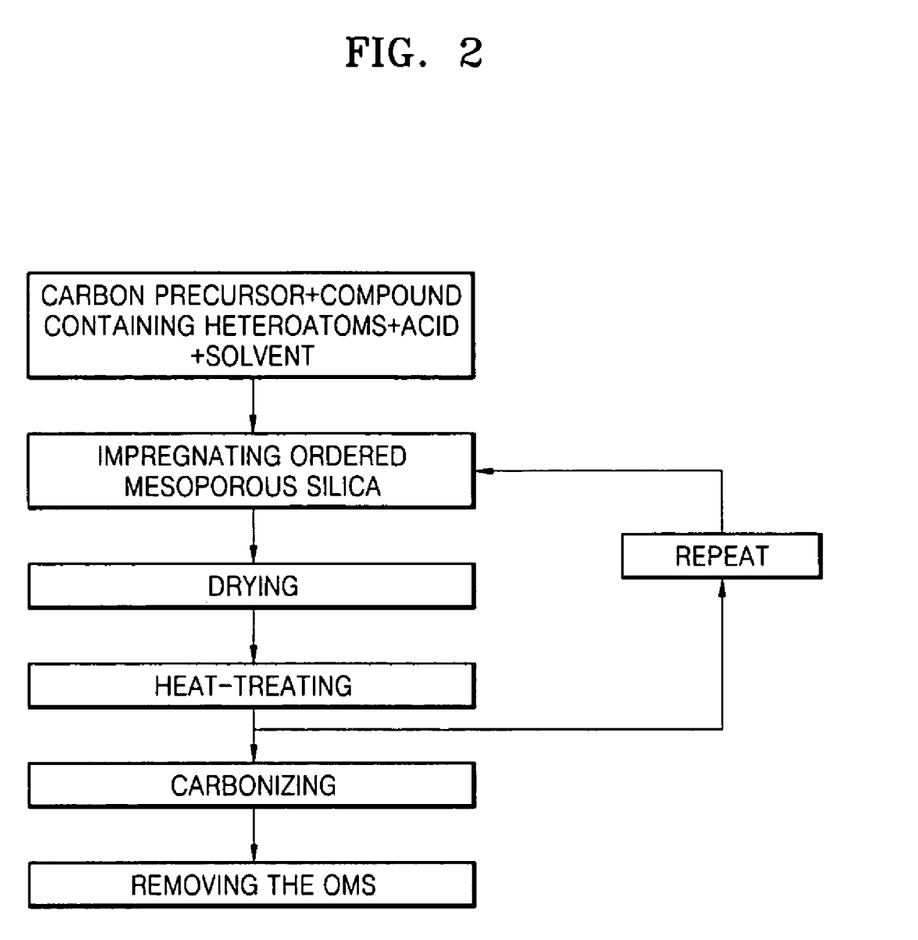
FIG. 2 is a flow chart illustrating a method of preparing mesoporous carbon according to an embodiment of the present invention.

A method of preparing mesoporous carbon according to an embodiment of the present invention will now be described in detail with reference to FIG. 2. Further, another embodiment of the present invention relates to a mesoporous carbon containing at least one heteroatom and formed by the method described herein.

A carbon precursor, a compound containing at least one heteroatom, an acid and a solvent are mixed to obtain a carbon precursor mixture.

As non-limiting examples, the compound containing at least one heteroatom may include at least one of $H_3BO_3$, $H_3PO_4$, $HBO_2$, $H_2B_4O_7$, $B_{10}H_{14}$, $Na_2B_{47}$, $NaBO_3 \cdot H_2O$, $NaBO_2$ hydrate, $BPO_4$ hydrate, $H_3PO_2$, $NaPO_3$, $Na_3PO_4$, $NaH_2PO_2$ hydrate, $Na_5P_3O_{10}$, and $Na_2HPO_3$.

The amount of the compound containing at least one heteroatom may be in the range of 0.5 to 25 parts by weight based on 100 parts by weight of the carbon precursor. When the amount of the compound containing at least one heteroatom is less than 0.5 parts by weight, the added heteroatoms may have little effect. When the amount of the compound containing at least one heteroatom is greater than 25 parts by weight, it may be difficult to form the mesoporous carbon structure.

As non-limiting examples, the carbon precursor may be a carbohydrate such as sucrose, furfuryl alcohol, divinylbenzene, phenol-formaldehyde, resorcinol-formaldehyde, or an aromatic compound such as phenanthrene, anthracene, or benzene. The acid that is used to prepare the precursor mixture may be an organic acid or an inorganic acid. Non-limiting examples of the acid include sulfuric acid, nitric acid, phosphoric acid, and para-toluene sulfuric acid.

The solvent that is used to prepare the precursor mixture may be any solvent that can uniformly disperse the carbon precursor. More particularly, as non-limiting examples, the solvent may be water, acetone, methanol, ethanol, isopropylalcohol, n-propylalcohol, butanol, dimethylacetamide, dimethylformamide, dimethylsulfoxide, N-methyl-2-pyrrolidone, tetrahydrofurane, tetrabutylacetate, n-butylacetate, m-cresol, toluene, ethyleneglycol, γ-butyrolactone, hexafluoroisopropanol (HFIP), or the like. These materials can be used alone or in combination.

In the carbon precursor mixture, the amount of the carbon precursor may be in the range of 5 to 40 parts by weight based on 100 parts by weight of carbon precursor mixture. When the amount of the carbon precursor is less than 5 parts by weight, the mesoporous carbon may not be sufficiently formed. When the amount of carbon precursor is greater than 40 parts by weight, the carbon precursor may not be sufficiently dissolved in the solvent and particles are very likely to agglomerate, and thus the size of the surface area decreases.

The amount of the acid may be in the range of 5 to 400 parts by weight based on 100 parts by weight of the carbon precursor. When the amount of the acid is less than 5 parts by weight, it may be difficult to facilitate the generation of the mesoporous carbon. On the other hand, when the amount of the acid is greater than 400 parts by weight, the formation of a carbon material may be facilitated even outside the OMS, and thus, a degree of order may be reduced.

In the carbon precursor mixture, the amount of the solvent may be in the range of 100 to 500 parts by weight based on 100 parts by weight of the carbon precursor. When the amount of the solvent is less than 100 parts by weight, the carbon precursor may be insufficiently dissolved in the solvent. When the amount of the solvent is greater than 500 parts by weight, particles are very likely to agglomerate.

The OMS is impregnated with the carbon precursor mixture prepared above. Then, the result is heat-treated and carbonized to form an OMS-carbon complex.

The OMS may have a molecular sieve material structure such that one-dimensional pores are mutually connected by micropores, but is not limited thereto. More particularly, the OMS may be MCM-48, which has a cubic structure, SBA-1, which has another cubic structure, SBA-15, which has a hexagonal structure, KIT-1, MSU-1, or the like, all of which have a three-dimensional connection structure. Furthermore, the OMS may be any type of a molecular sieve material that contains any type of mesoporous material structured such that one-dimensional pores are mutually connected by micropores.

The amount of the OMS that is impregnated with the carbon precursor mixture may be in the range of 0.5 to 15 parts by weight based on 100 parts by weight of the carbon precursor mixture. When the amount of the OMS is less than 0.5 parts by weight, the amount of the precursor mixture may be too high. As a result, after impregnation, particles are very likely to agglomerate such that the surface area of the mesoporous carbon decreases. When the amount of the OMS is greater than 15 parts by weight, the amount of the precursor is relatively low such that a carbon structure may not be sufficiently formed in the silica pores.

The impregnating temperature is not particularly limited, but may be room temperature.

If necessary, the precursor mixture that is impregnated may be dried. The drying temperature is not particularly limited, but may be room temperature. In addition, for quick drying, the drying process may be performed under reduced pressure.

The heat treatment may be performed at 50 to 250° C. When the heat treatment temperature is less than 50° C., the structure of the mesoporous carbon may be improperly formed. When the heat treatment temperature is greater than 250° C., the uniformity of the mesoporous carbon to be formed may decrease. Alternatively, the heat treatment may be divided into a first heat treatment and a second heat treatment. For example, the first heat treatment may be performed at about 50 to about 150° C., and the second heat treatment may be performed at about 150 to about 250° C. Through the heat treatment, a mesoporous carbon structure is formed, and a liquid solvent and the like are completely removed.

The mesoporous carbon may be prepared by impregnating an OMS material, heat-treating the impregnated OMS material and then directly carbonizing the heat-treated impregnated OMS material as described below. However, if the impregnation and heat-treatment is carried out only once, there is a possibility that the carbon structure may be incompletely formed in the OMS pores. Accordingly, before the impregnated OMS material is carbonized, cycles of impregnating and heat treating may be repeatedly performed to ensure a complete formation of a carbon structure in the mesoporous silica pores. For example, the impregnating and heat treating may be carried out two to ten times. Repetition of the impregnation and the heat treatment more than 10 times is generally unnecessary because the attainable effects of the reaction can be obtained with fewer repetitions.

As described above, the heat-treated result is carbonized to obtain an ordered mesoporous carbon structure within an OMS-carbon complex. The carbon precursor that is impregnated into the OMS acting as a template becomes graphitized and ordered through the carbonization. The carbonization may be achieved using a heating device such as an electric furnace heating the heat-treated result to 700° C. to 1500° C.

When the carbonizing temperature is lower than 700° C., graphitization may occur incompletely, and thus, the degree of ordering may be low. When the carbonizing temperature is higher than 1500° C., carbon may thermally decompose or the structure of the OMS acting as the template may be deformed.

The carbonization may be performed in a non-oxidizing atmosphere. The non-oxidizing atmosphere may be one of a vacuum atmosphere, a nitrogen atmosphere, and an inert gas atmosphere.

Then, the OMS is removed from the OMS-carbon complex using a solvent capable of selectively dissolving the OMS.

The solvent that can selectively dissolve the OMS may include, for example, an aqueous HF solution or an aqueous NaOH solution. The concentration of the aqueous HF solution may be 5 to 47 wt % and, the concentration of the aqueous NaOH solution may be 5 to 30 wt %.

It is well known that the OMS becomes a water-soluble silicate through alkali melting or carbonate dissociation, and reacts with HF to form $SiF_4$, which easily erodes. By removing the OMS, the ordered mesoporous carbon can be separated.

The mesoporous carbon obtained according to an embodiment of the present invention may be ordered mesoporous carbon in which pores are regularly arranged.

In the mesoporous carbon according to an embodiment of the present invention, the amount of the heteroatom may be in the range of 0.5 to 20 parts by weight based on 100 parts by weight of the mesoporous carbon containing the heteroatom. When the amount of the heteroatom is less than 0.5 parts by weight, the effect of the added heteroatoms may be insignificant. When the amount of the heteroatom is greater than 20 parts by weight, ordered mesoporous carbon may not be formed.

While a conventional amorphous microporous carbon powder includes micropores only, the mesoporous carbon according to an embodiment of the present invention includes mesopores and micropores in a proper ratio. Herein, according to the International Union of Pure and Applied Chemistry (IUPAC), a micropore is defined as a pore of about 2 nm or less in diameter, and a mesopore is defined as a pore of 2 to 50 nm in diameter.

The average diameter of mesopore of the mesoporous carbon according to an embodiment of the present invention is 2 to 15 nm. The mesoporous carbon has a specific surface area of 300 to 2000 $m^2/g$. Also, the sheet resistance of the mesoporous carbon is 20 to 60 $m\Omega/cm^2$ when measured using a 4-point probe method at a pressure of 150.8±3.0 $kg_f/cm^2$, and the sheet resistance of the mesoporous carbon according to an embodiment of the present invention is much lower than that of conventional mesoporous carbon.

When the average diameter of the mesopore is less than 2 nm, diffusion of a supplied fuel may not smoothly occur and activity of the catalyst may be limited. When the average diameter of the mesopore is greater than 15 nm, catalyst particles easily increase in size when a catalyst is produced, and thus, efficiency of the catalyst may decrease.

When the specific surface area of the mesoporous carbon is less than 300 $m^2/g$, it may be difficult to improve the dispersion of metal particles to be loaded. When the specific surface area of the mesoporous carbon is greater than 2000 $m^2/g$, diffusion of fuel may be limited because of too many micropores, and thus, the efficiency of a catalyst decreases.

Since pores in the mesoporous carbon according to an embodiment of the present invention are regularly arranged, main peak of Bragg 2theta ($2\theta$) for a CuK-$\alpha$ characteristic X-ray wavelength of 1.541 Å appears at least between 0.5 to 1.5 degrees. Additionally, one or more relatively weak peaks can be observed between 1.5° and 5°. The structure (space group) of the mesoporous carbon can be determined by analyzing the locations of the peaks.

A supported catalyst that contains the mesoporous carbon acting as a support will now be described in detail.

A supported catalyst according to an embodiment of the present invention includes the mesoporous carbon containing the at least one heteroatom and metal catalyst particles that are distributed and supported on the mesoporous carbon. The metal catalyst particles are distributed and supported on the surface or in pores of the mesoporous carbon.

The metal catalyst that can be used in the supported catalyst is not particularly limited, but may be Ti, V, Cr, Mn, Fe, Co, Ni, Cu, Zn, Al, Mo, Se, Sn, Pt, Ru, Pd, W, Ir, Os, Rh, Nb, Ta, Pb, Bi, or a combination of these.

A suitable metal catalyst may vary according to a reaction to which the supported catalyst is to be subjected. In addition, the metal catalyst may be a single metal or an alloy of two or more metals.

More particularly, when the supported catalyst according to an embodiment of the present invention is used in a catalyst layer of a cathode or an anode of a fuel cell, such as a phosphoric acid fuel cell (PAFC) or a proton exchange membrane fuel cell (PEMFC), Pt can be used as the metal catalyst. In another embodiment, the supported catalyst may be used in a catalyst layer of an anode of a direct methanol fuel cell (DMFC), in which case, an alloy of Pt and Ru may be used as the metal catalyst. In this case, the atomic ratio of Pt to Ru may be, in general, in the range of about 0.5:1 to about 2:1. In yet another embodiment, the supported catalyst may be used in a catalyst layer of a cathode of a DMFC, in which case, Pt may be used as the metal catalyst.

When the average particle size of the metal catalyst particles is too small, the catalyst reaction may not be facilitated. On the other hand, when the average particle size of the metal catalyst particles is too large, the reaction surface area of the entire catalyst particle is reduced and thus, the efficiency of the supported catalyst may be reduced. In consideration of these problems, the average particle size of the metal catalyst particle may be in the range of about 1 nm to about 5 nm.

When the amount of the metal catalyst contained in the supported catalyst is too small, the metal catalyst may have little effect when applied to a fuel cell. When the amount of the metal catalyst particle contained in the supported catalyst is too large, the manufacturing costs may increase and the catalyst particle size may increase. In consideration of these problems, the amount of the metal catalyst contained in the supported catalyst may be in the range of 40 to about 80 parts by weight based on 100 parts by weight of the supported catalyst.

The supported catalyst according to an embodiment of the present invention can be formed using various known methods of producing a supported catalyst. For example, the supported catalyst according to an embodiment of the present invention may be formed by impregnating a support with a metal catalyst precursor solution and reducing the impregnated metal catalyst precursor. The method of producing a supported catalyst is described in various references in detail, and thus will not be described herein in detail.

A fuel cell according to an embodiment of the present invention will now be described in detail.

The fuel cell according to an embodiment of the present invention includes a cathode, an anode, and an electrolyte membrane interposed therebetween. Here, at least one of the cathode and the anode includes the supported catalyst according to an embodiment of the present invention described above.

The fuel cell may be realized as, for example, a PAFC, a PEMFC, or a DMFC. The structures of these fuel cells and methods of manufacturing them are not particularly limited, and are described in detail in various references. Accordingly, the structure and manufacturing method of the fuel cell will not be described herein in detail.

The present invention will be described in further detail with reference to the following examples. These examples are for illustrative purposes only and are not intended to limit the scope of the present invention.

EXAMPLE 1

1.25 g of sucrose, 0.14 g sulfuric acid and 0.104 g of $H_3BO_3$ were completely dissolved in 4 mL of water to prepare a homogeneous carbon precursor mixture.

1 g of SBA-15, which is an OMS, was impregnated with 60 wt % of the carbon precursor mixture. The impregnated SBA-15 was dried in an oven at 100° C. for 6 hours, and then dried in the oven at 160° C. for 6 hours.

The dried result was impregnated with the remaining 40 wt % of the carbon precursor mixture. The impregnated result was dried in the same manner as described above.

The dried result was cooled to room temperature, slowly heated under a nitrogen atmosphere and carbonized at about 900° C.

The carbonized result was repeatedly stirred with a mixed solution containing HF, water and ethanol to remove the SBA-15, thereby obtaining a mesoporous carbon containing boron as a heteroatom.

EXAMPLE 2

Mesoporous carbon containing boron as a heteroatom was prepared in the same manner as in Example 1, except that 0.208 g of $H_3BO_3$ was used instead of 0.104 g of $H_3BO_3$.

EXAMPLE 3

Mesoporous carbon containing boron as a heteroatom was prepared in the same manner as in Example 1, except that 0.052 g of $H_3BO_3$ was used instead of 0.104 g of $H_3BO_3$.

EXAMPLE 4

Mesoporous carbon containing phosphorous as a heteroatom was prepared in the same manner as in Example 1, except that 0.329 g of $H_3PO_4$ was used instead of 0.104 g of $H_3BO_3$.

EXAMPLE 5

Mesoporous carbon containing phosphorous as a heteroatom was prepared in the same manner as in Example 1, except that 0.165 g of $H_3PO_4$ was used instead of 0.104 g of $H_3BO_3$.

EXAMPLE 6

Mesoporous carbon containing phosphorous as a heteroatom was prepared in the same manner as in Example 1, except that 0.082 g of $H_3PO_4$ was used instead of 0.104 g of $H_3BO_3$.

EXAMPLE 7

Mesoporous carbon containing phosphorous as a heteroatom was prepared in the same manner as in Example 1, except that 0.041 g of $H_3PO_4$ was used instead of 0.104 g of $H_3BO_3$.

COMPARATIVE EXAMPLE 1

Mesoporous carbon was prepared in the same manner as in Example 1, except that neither $H_3BO_3$ nor $H_3PO_4$ was used to prepare the carbon precursor mixture, thereby producing a mesoporous carbon not containing a heteroatom.

Figure 3:
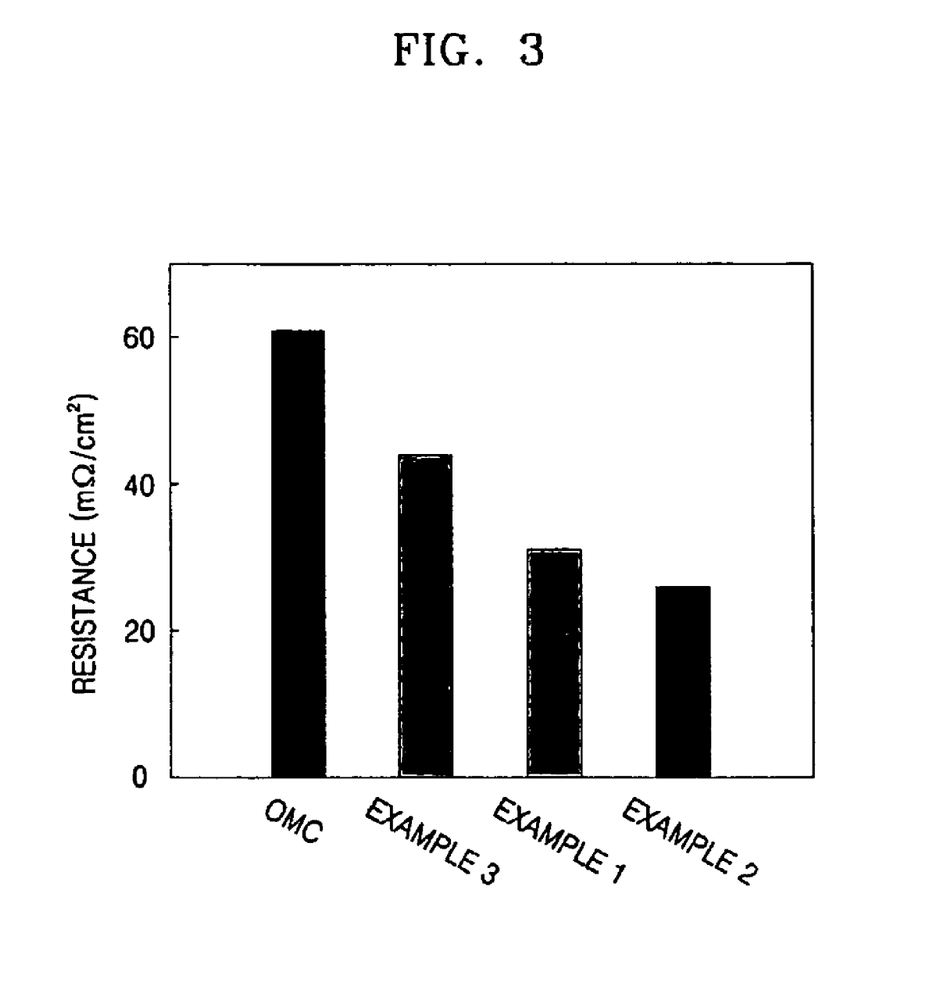
FIG. 3 is a graph illustrating the results of measuring the sheet resistance of mesoporous carbon prepared in Examples 1 through 3 and Comparative Example 1.

FIG. 3 illustrates the results of measuring the sheet resistance of the mesoporous carbon prepared in Examples 1 through 3 and Comparative Example 1 (labeled in FIG. 3 as "OMC"). The sheet resistance was measured as follows.

The sheet resistance was measured using a 4-point probe method. 50 mg of the mesoporous carbon of Examples 1 through 3 and Comparative Example 1 was placed in a sheet resistance measurement system (CMT series, Changmintech) and the sheet resistance was measured while applying a pressure of 150.8 kg/cm² to the mesoporous carbon. The sheet resistance measurement system included 4 electrodes, i.e., a pair of electrodes for measuring a voltage and a pair of electrodes for measuring a current at the bottom of a chamber containing the material to be measured.

Referring to FIG. 3, the mesoporous carbon containing boron of Examples 1 through 3 had a much lower sheet resistance than the mesoporous carbon of Comparative Example 1. The sheet resistance decreased as the amount of added boron was increased.

Figure 4:
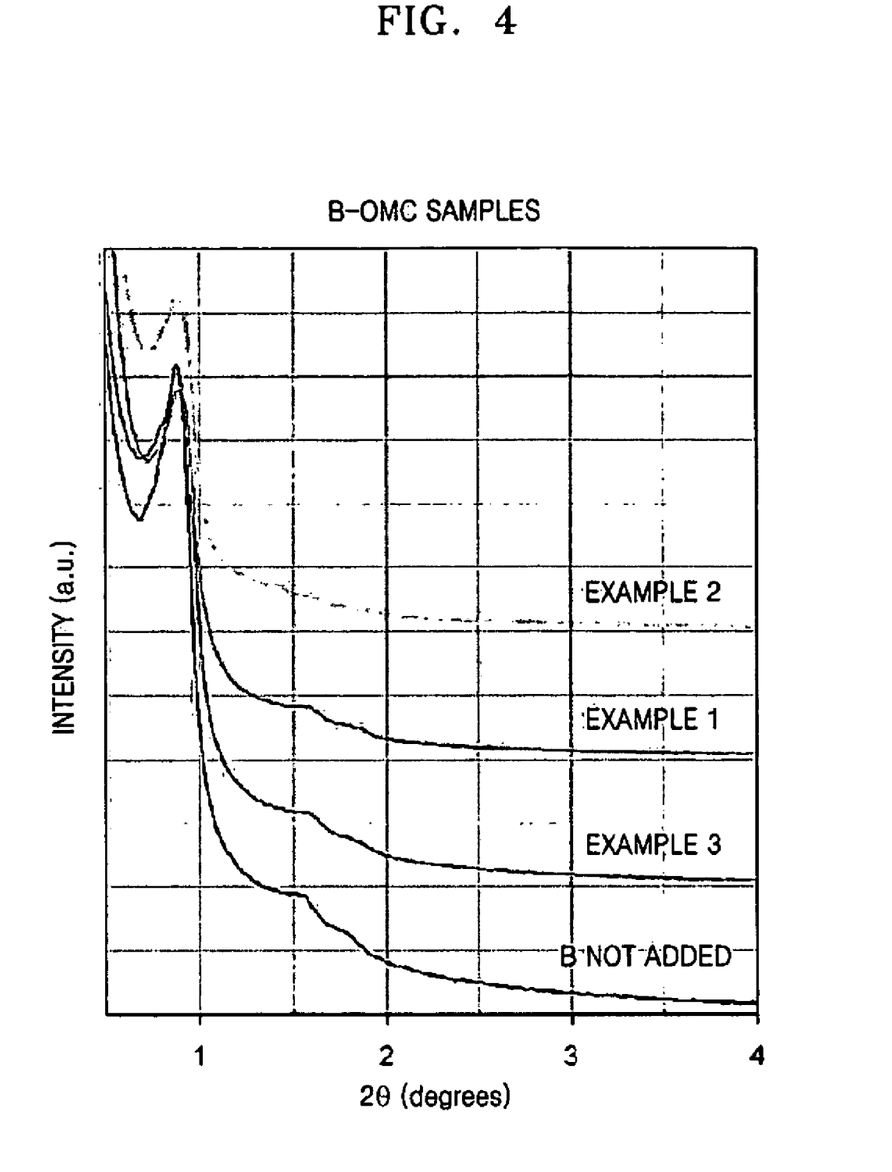
FIG. 4 is a graph illustrating the result of X-ray diffraction analysis on the mesoporous carbon prepared in Examples 1 through 3 and Comparative Example 1.

FIG. 4 illustrates the result of X-ray diffraction analysis on the mesoporous carbon prepared in Examples 1 through 3 and Comparative Example 1 (labeled in FIG. 4 as "B NOT ADDED").

Referring to FIG. 4, all the main peaks from Examples and Comparative Example 1 appeared at 0.9°. The intensity of peaks between 1.5° and 2° decreased as the amount of boron increased. This is because the long-range regularity of Examples decreases although the main pore structure of the mesoporous carbon is similar.

Figure 5:
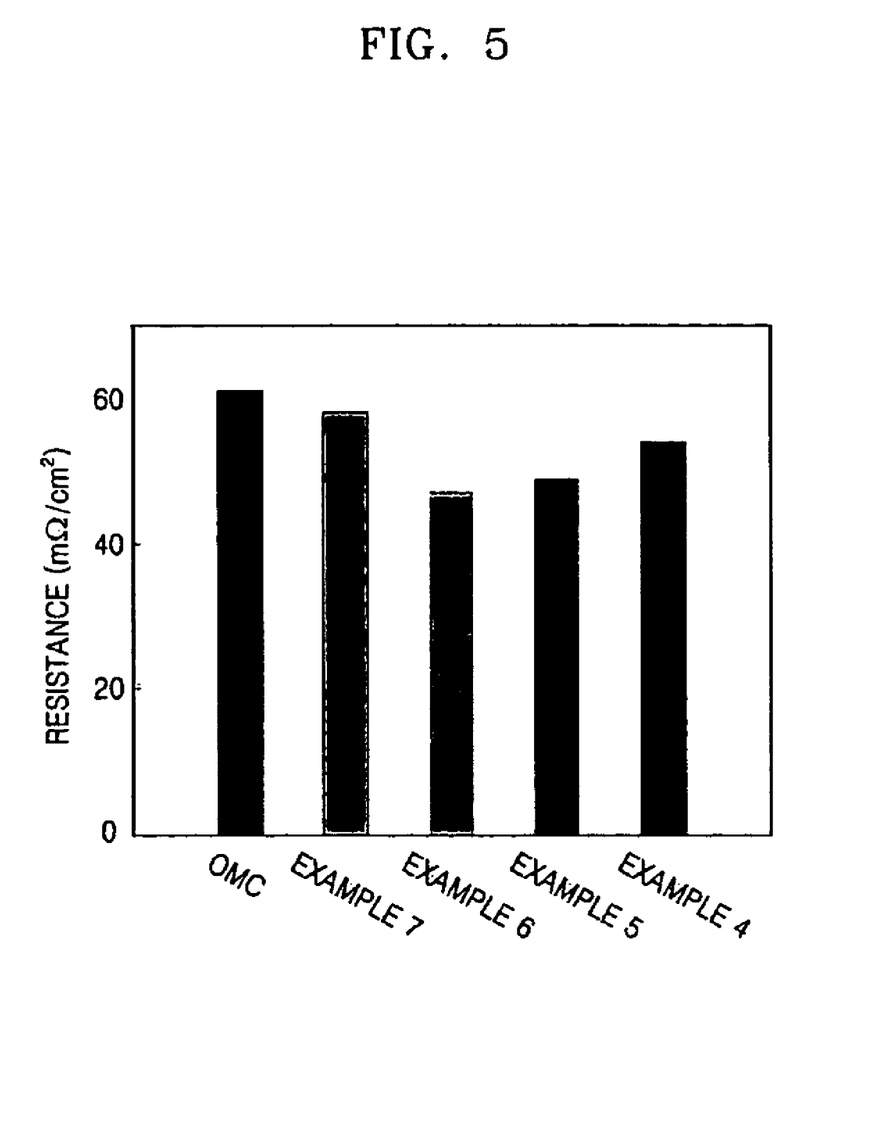
FIG. 5 is a graph illustrating the results of measuring the sheet resistance of mesoporous carbon prepared in Examples 4 through 7 and Comparative Example 1.

FIG. 5 illustrates the results of measuring the sheet resistance of the mesoporous carbon prepared in Examples 4 through 7 (containing phosphorous) and Comparative Example 1 (not containing a heteroatom).

Referring to FIG. 5, the sheet resistance of the mesoporous carbon containing phosphorous decreased less than that the sheet resistance of the mesoporous carbon containing boron. A proper amount of phosphorous minimizes the sheet resistance, as can be discerned from the fact that Example 6 shows the lowest sheet resistance in FIG. 5.

Figure 6:
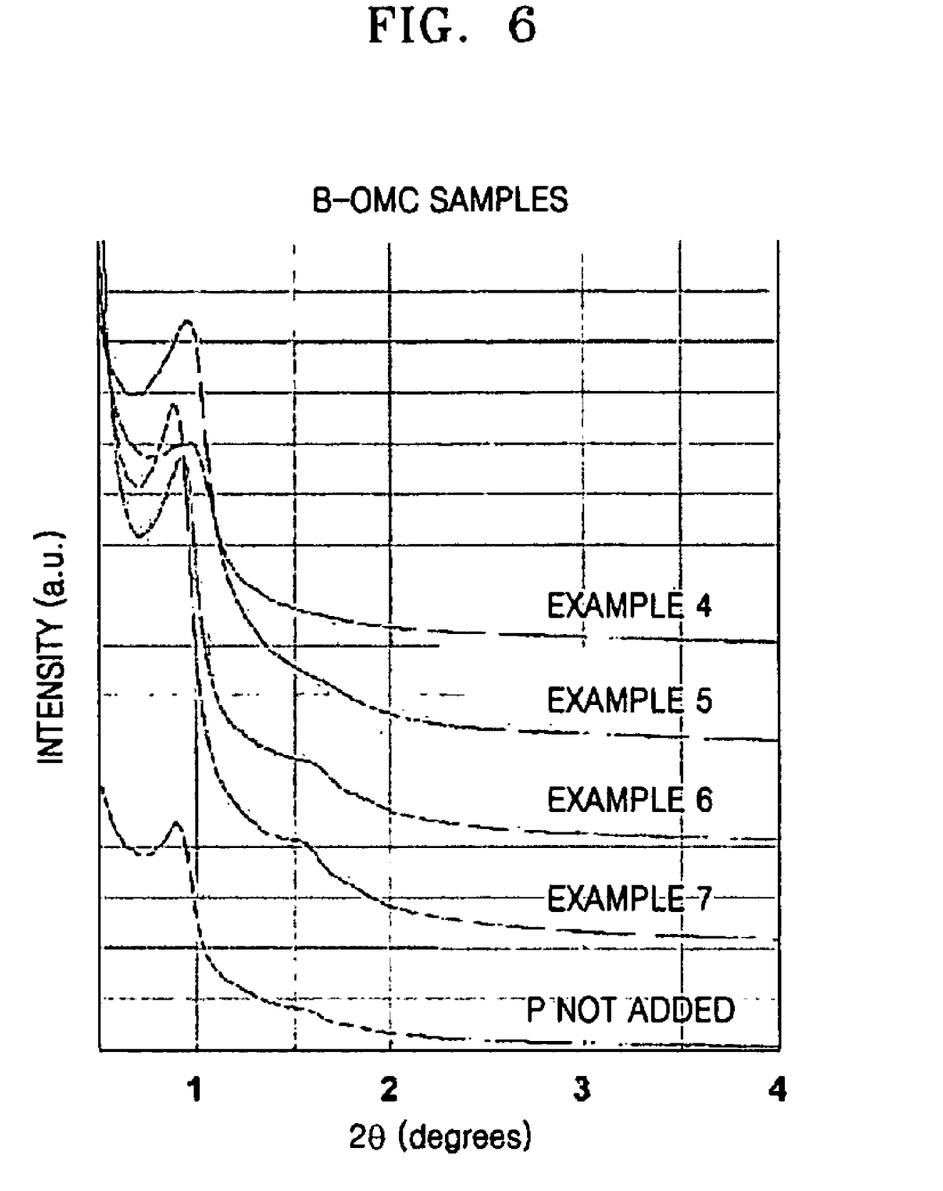
FIG. 6 is a graph illustrating the result of X-ray diffraction analysis on the mesoporous carbon prepared in Examples 4 through 7 and Comparative Example 1.

FIG. 6 illustrates the result of X-ray diffraction analysis of the mesoporous carbon prepared in Examples 4 through 7 and Comparative Example 1 (labeled in FIG. 6 as "P NOT ADDED").

Referring to FIG. 6, all the main peaks appeared at 0.9°. The intensity of the relatively weak peaks relative to the main peaks decreased as the amount of phosphorous increased. The intensity of peaks between 1.5° and 2° decreased as the amount of phosphorous increased. This is because the long-range regularity of Examples decreases although the main pore structure of the mesoporous carbon was similar for Examples 4 through 7 and Comparative Example 1.

The surface area, the pore volume and the pore diameter of the mesoporous carbon of Example 1 and Comparative Example 1 are shown in Table 1.

TABLE 1

|  | Surface area ($m^2/g$) | Pore volume ($cm^3/g$) | Pore diameter (nm) |
|---|---|---|---|
| Example 1 | 963 | 1.08 | 4.6 |
| Comparative Example 1 | 1337 | 1.6 | 4.0 |

According to Table 1, the samples prepared in Example 1 and Comparative Example 1 have sufficiently large surface areas to be used as a support for catalysts, although the surface area somewhat decreased as boron is added thereto. The pore diameter of Example 1 was somewhat larger and pore volume in Example 1 was somewhat smaller compared with the pore diameter and pore volume of the samples prepared in Comparative Example 1. This is because micropores decreased as crystallization was enhanced by introduction of boron in Example 1. However, the mesoporous carbons having these physical properties can be used as a support for catalysts of fuel cells or as an electrode material itself.

EXAMPLE 8

Manufacture of Supported Catalyst and Fuel Cell 0.5 g of the mesoporous carbon containing boron as prepared in Example 1 was placed in a vinyl bag. 1.9232 g of $H_2PtCl_6$ was dissolved in 1.5 ml of acetone, and the $H_2PtCl_6$ solution was added to the vinyl bag containing the mesoporous carbon.

The mixed solution was dried in air for four hours, transferred to a crucible, and then dried in a drying device at 60° C. overnight. Then, the crucible was placed in an electric furnace through which nitrogen was passed for 10 minutes. Then, hydrogen was passed through while the temperature was increased from room temperature to 200° C. and then maintained at 200° C. for 2 hours so that the Pt salt impregnated in the mesoporous carbon containing boron was reduced. The gas flowing in the electric furnace was replaced with nitrogen. The temperature was increased to 250° C., maintained at 250° C. for 5 hours, and then slowly reduced to room temperature. As a result, a supported catalyst in which the concentration of impregnated Pt was 60% by weight was obtained.

The supported catalyst was dispersed in a solution prepared by dispersing NAFION 115 (DuPont) in isopropylalcohol to form a slurry. The slurry was coated onto a carbon electrode through a spraying process. The concentration of the coated catalyst was 3 mg/cm² based on the amount of Pt. Then, the electrode was passed through a rolling machine to increase an adhesive force between a catalyst layer and a carbon paper, thus forming a cathode.

An anode electrode was produced using a commonly available PtRu black catalyst. Then, a unit cell was produced using the cathode and the anode.

COMPARATIVE EXAMPLE 2

Manufacture of Supported Catalyst and Fuel Cell

A supported catalyst and a unit cell was produced by impregnating Pt into the mesoporous carbon prepared according to Comparative Example 1 instead of the mesoporous carbon containing boron in Example 1 in the same manner as in Example 8.

Performances of the unit cells prepared in Example 8 and Comparative Example 2 were measured at 50° C. while 2M methanol and an excessive amount of air were supplied.

The fuel cell prepared in Example 8 exhibited higher performance than the fuel cell prepared in Comparative Example 2.

The mesoporous carbon according to an aspect of the present invention contains a heteroatom such as boron or phosphorous to reduce sheet resistance, and thus can efficiently transfer electric energy. Such mesoporous carbon can be used as a conductive material of electrodes for fuel cells. When the mesoporous carbon is used as a support for catalysts of electrodes, a supported catalyst containing the support can be used to manufacture a fuel cell having high efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of preparing mesoporous carbon for a fuel cell, the mesoporous carbon containing at least one heteroatom, the method comprising:
   impregnating an ordered mesoporous silica (OMS) with a carbon precursor mixture comprising a carbon precursor, a compound containing the at least one heteroatom selected from the group consisting of boron and phosphorus, an acid and a solvent, wherein the compound containing the at least one heteroatom is provided in an amount such that the amount of the heteroatom in the mesoporous carbon is 0.5 to 20 parts by weight based on 100 parts by weight of the mesoporous carbon;
   heat-treating the impregnated OMS;
   carbonizing the heat-treated OMS to form an OMS-carbon complex; and
   removing the OMS from the OMS-carbon complex to obtain the mesoporous carbon containing the at least one heteroatom.

2. The method of claim 1, wherein the compound containing the at least one heteroatom comprises at least one compound selected from the group consisting of $H_3BO_3$, $H_3PO_4$, $HBO_2$, $H_2B_4O_7$, $B_{10}H_{14}$, $Na_2B_4O_7$, $NaBO_3.H_2O$, $NaBO_2$ hydrate, $BPO_4$ hydrate, $H_3PO_2$, $NaPO_3$, $Na_3PO_4$, $NaH_2PO_2$ hydrate, $Na_5P_3O_{10}$, $Na_2HPO_3$.

3. The method of claim 1, wherein the amount of the compound containing the at least one heteroatom in the carbon precursor mixture is 0.5 to 25 parts by weight based on 100 parts by weight of the carbon precursor.

4. The method of claim 1, wherein the carbon precursor includes at least one compound selected from the group consisting of carbohydrates, furfuryl alcohol, divinylbenzene, phenol-formaldehyde, resorcinol-foimaldehyde, phenanthrene, anthracene, and benzene.

5. The method of claim 1, wherein the acid includes at least one acid selected from the group consisting of sulfuric acid, nitric acid, phosphoric acid, and para-toluene sulfuric acid.

6. The method of claim 1, wherein the solvent includes at least one solvent selected from the group consisting of water, acetone, methanol, ethanol, isopropylalcohol, n-propylalcohol, butanol, dimethylacetamide, dimethylformamide, dimethylsulfoxide, n-methyl-2-pyrrolidone, tetrahydrofurane, tetrabutylacetate, n-butylacetate, m-cresol, toluene, ethyleneglycol, γ-butyrolactone, hexafluoroisopropanol (HFIP).

7. The method of claim 1, the amount of the acid is 5 to 400 parts by weights based on 100 parts by weight of the carbon precursor, and the amount of the solvent is 100 to 500 parts by weight based on 100 parts by weight of the carbon precursor.

8. The method of claim 7, wherein the OMS is MCM-48, SBA-1, SBA-15, KIT-1 or MSU-1.

9. The method of claim 1, wherein the impregnating of the OMS with the carbon precursor mixture is carried out by impregnating the OMS with a first portion of the carbon precursor mixture, heat-treating the OMS impregnated with the first portion of the carbon precursor mixture at a temperature of 50 to 250° C., and carrying out at least one additional cycle wherein the OMS is impregnated with at least one additional portion of the carbon precursor and then heat treated.

10. The method of claim 1, wherein the OMS is removed from the OMS-carbon complex by dissolving the mesoporous silica with an aqueous HF solution or an aqueous NaOH solution.

11. A mesoporous carbon for a fuel cell, the mesoporous carbon containing at least one heteroatom and formed by the method of claim 1.

12. A supported catalyst for a fuel cell, the supported catalyst comprising:
the mesoporous carbon containing the at least one heteroatom of claim 11; and
metal catalyst particles that are supported on the mesoporous carbon containing the at least one heteroatom.

13. A fuel cell comprising:
a cathode;
an anode; and
an electrolyte membrane interposed between the cathode and the anode,
wherein at least one of the cathode and the anode comprises the supported catalyst of claim 12.

* * * * *

UNITED STATES PATENT AND TRADEMARK OFFICE
CERTIFICATE OF CORRECTION

| | | |
|---|---|---|
| PATENT NO. | : 8,043,595 B2 | Page 1 of 1 |
| APPLICATION NO. | : 11/443167 | |
| DATED | : October 25, 2011 | |
| INVENTOR(S) | : Chan-ho Pak et al. | |

It is certified that error appears in the above-identified patent and that said Letters Patent is hereby corrected as shown below:

Column 10, Claim 4, line 58.  Delete "resorcinol-foimaldehyde,"
Insert -- resorcinol-formaldehyde, --

Signed and Sealed this
Second Day of October, 2012

David J. Kappos
*Director of the United States Patent and Trademark Office*